United States Patent

[11] 3,587,655

| [72] | Inventor | Herbert Schindler |
| | | Pirmasens, Germany |
| [21] | Appl. No. | 792,117 |
| [22] | Filed | Jan. 17, 1969 |
| [45] | Patented | June 28, 1971 |
| [73] | Assignee | Firma Schon & Cie, Gesellschaft Mit |
| | | Beschrankter Haftung |
| | | Pirmasens, Germany |
| [32] | Priority | Jan. 18, 1968 |
| [33] | | Germany |
| [31] | | Sch 44077 |

[54] SUPPLY LINE FOR THERMOPLASTIC CEMENT IN LASTING MACHINES
9 Claims, 3 Drawing Figs.

[52] U.S. Cl. .................................................... 138/120,
285/163, 285/355
[51] Int. Cl. ........................................................ F16l 11/00,
F16l 27/00, F16l 19/00
[50] Field of Search .......................................... 138/33,
120; 285/94, 95, 113, 163, 168, 179, 181, 355, 393

[56] References Cited
UNITED STATES PATENTS

| 351,605 | 10/1886 | Kennedy | 285/355 |
| 757,313 | 4/1904 | Joynt | 285/179X |
| 1,130,965 | 3/1915 | Doran | 285/168 |
| 2,078,195 | 4/1937 | Cornell, Jr. | 285/179X |
| 2,915,615 | 12/1959 | Leipold et al. | 138/33X |
| 3,002,770 | 10/1961 | Chesnut et al. | 285/94 |

Primary Examiner—Robert M. Walker
Attorney—Freidman & Goodman

ABSTRACT: In a deformable and pivotable supply line for supplying thermoplastic cement to be applied to an insole when bonding the edge of a covering leather thereto, one end of the supply line communicating with a cement heating container, the other end accommodating a cement applicator adjacent to the last in a lasting machine, which latter end is movable for that purpose, a heating element along said supply line for maintaining the liquid cement conveyed therethrough at an elevated temperature, said supply line being made up from at least two lengths of connected metal tubing in threading association the lengths of metal tubing including outer thread sets, the connections therefor including inner and/or outer thread sets, the improvement comprising providing the inner and outer thread sets with an extra large degree of free play, the resulting clearances being filled by a sealing band of heat-resistant synthetic resin, said band being applied to the outer thread set of the tubing lengths or connections therefor.

PATENTED JUN 28 1971 3,587,655
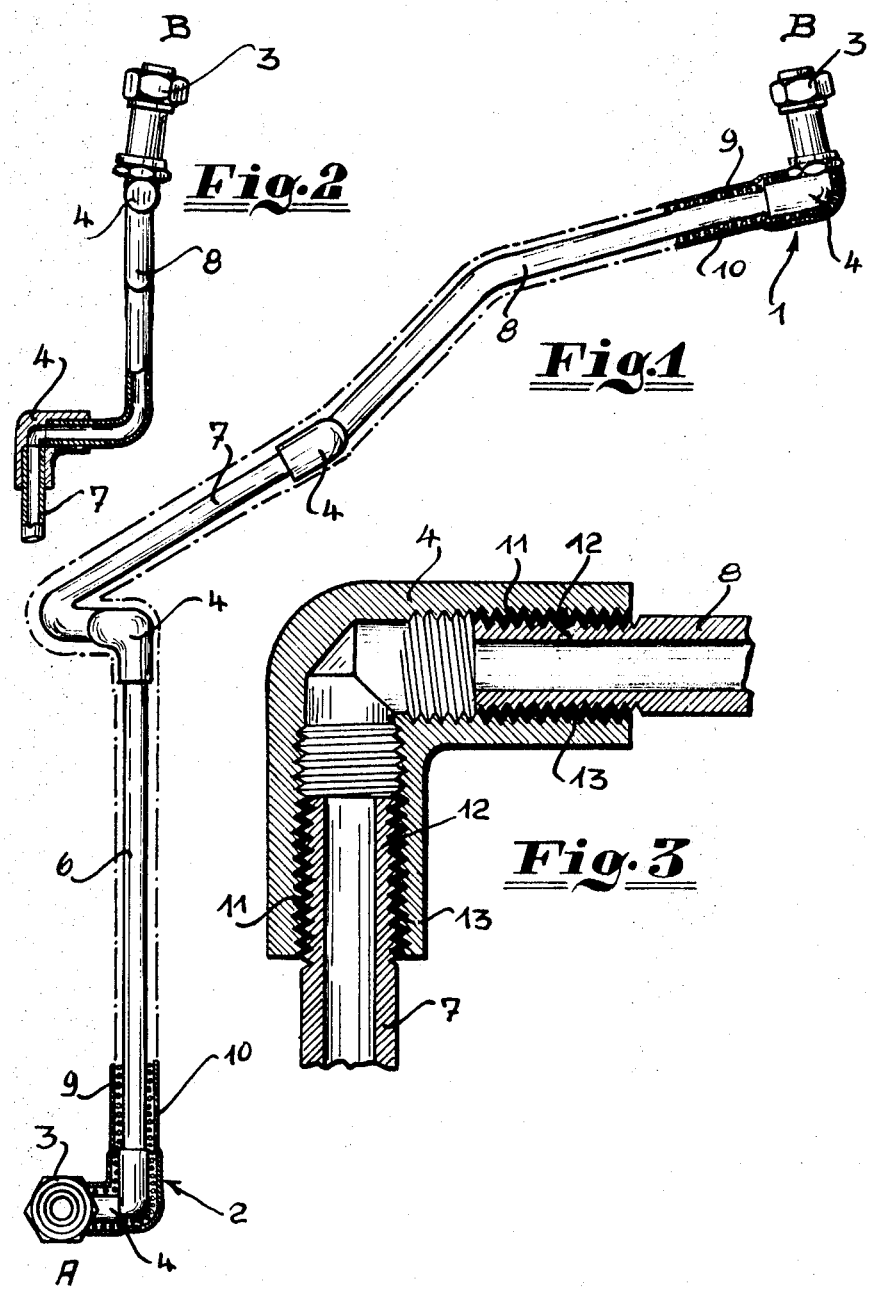
INVENTOR
HERBERT SCHINDLER
BY Friedman & Goodman
ATTORNEYS

3,587,655

SUPPLY LINE FOR THERMOPLASTIC CEMENT IN LASTING MACHINES

BACKGROUND OF THE INVENTION

1. Field of the Invention

The invention relates to thermoplastic improved deformable and pivotable supply line for conveying a thermosplastic cement to be applied to an insole when bonding the edge of a covering leather thereto.

2. Description of the Prior Art

A thermoplastic cement has been in use for some time in conjunction with shoe-end lasting machines in order to bond the upper or covering leather to the insole. The thermoplastic cement is applied to the insole by means of a supply line built into the machine shortly before the upper leather is moved towards the insole and pressed thereagainst by the edging tools.

The thermoplastic cement used is, for example, a solid granulated material brought to its usable state in a melting container mounted on the machine frame. Working vary, the average being approximately 220° C. The cement container or the melting chamber for the granulated cement material is preferably positioned laterally on the machine, while the working position where the cement is actually applied is located centrally in the machine. During the bonding procedure, the shoe insole rests on a last support member and the cement applicator is spaced approximately 20 millimeters from the insole. It is moved towards the latter only when the cement is to be applied thereto. Hence, it executes a vertical movement while the melting container remains stationary on the machine frame.

The temperature of the cement brought to its molten state in the container must not drop when the cement is conveyed through the pipeline, otherwise it will either harden again or at least become very viscous so that it cannot be made to flow. Accordingly, the line through which the cement flows from the melting container in the applicator must be heated.

Due to the mobility of the applicator device, the line itself must be made free to follow as well. It is known to use flexible hoses made of polytetrafluoroethylene, which is commercially available. A heating coil is then either inserted into the hose itself or, accommodated within its own sheathing, twisted around it. Also known is the use of corrugated metallic tubing, with the heating element again placed either within the tube itself or coiled around it. When the applicator is moved along, the hoses are subjected to a twisting movement and, as a result of the elevated temperatures and the feed pressure at which the cement is conveyed to the outlet point, they must withstand very high stresses. Under continuous operation conditions they have proved inadequate, their life-span being very short.

SUMMARY OF THE INVENTION

It thus becomes the objective of this invention to provide a supply line which would be resilient enough to withstand constant stresses and strains brought about by deformation, twisting and flexing, as well as high temperatures, and would be able to accommodate itself to the movements executed by the applicator without incurring any appreciable power losses while enjoying a practically unlimited life-span.

In accordance with the invention, the supply line is made up from sections of metal tubing and threaded pipe connections, conventionally known. However, in accord with the invention the inner and outer thread sets are provided with an extra-large degree of free play between the individual threads, the resulting clearances then being filled with a band of polytetrafluoroethylene or similar synthetic resin which remains plastic at the working temperatures involved. The band is wound onto the outer thread of the tubing length and/or the threaded connection members. The synthetic resin polytetrafluoroethylene is particularly well suited for this purpose inasmuch as it becomes plastified at elevated temperatures without losing its other advantageous mechanical properties to any appreciable degree so that it always remains a good sealing and resilient medium. The remaining rigid tubing lengths are thus transformed into articulated members, which can be moved in accordance with the degree of free play provided.

Preferably, to facilitate changes of position, one or several of the tubing lengths are bent and their ends are interconnected by elbow members. Depending on the circumstances, the elbow members can carry an inner thread and the tubing lengths outer threads; alternatively, use can be made of elbow members provided with one outer and one inner thread or with two inner threads.

The invention also provides for the entire length of the supply line, including the connecting pieces, to be equipped with a heating unit accommodated in its own insulating sheathing and wound thereon in a conventional manner.

BRIEF DESCRIPTION OF THE DRAWING

The invention will now be described in greater detail with the aid of a preferred embodiment shown in the accompanying drawing, in which:

FIG. 1 is a plan view;
FIG. 2 is a side view; and
FIG. 3 shows a detail of the supply line.

DESCRIPTION OF THE PREFERRED EMBODIMENTS

Referring now to FIG. 1, A is that end of the supply line which forms the outlet from the cement-heating chamber, which B identifies the applicator end. Endpiece 1 of the pipe line at B is moved into contact with the insole abutting the last carrier of the machine via the applicator, by turning or pivoting, or by means of a vertical movement, as the case may be; a reverse movement returns it into its initial position. The outermost end 2 of the supply line is rigidly attached to the cement-heating container. The connecting pieces at ends A and B of the supply line are nipples 3 of suitable configuration. Elbow members 4 are screwed onto nipples 3. At end A, a further elbow piece 5 is screwed onto elbow member 4; then follows a straight tube length 6, another elbow member 4', a bent tubing length 7, a further elbow member 4'' and then another bent tubing length 8 which is finally attached to a last elbow member 4''' at end 1.

It may be seen from the different spatial configurations of the supply line in FIGS. 1 and 2, that, depending on the position of the axes of the connecting pieces, a connecting line can be adapted by bending the tubes and providing elbow joints, provided that the connecting points maintain an unchanged mutual position. In the present case, and in accordance with the invention, as seen particularly in FIG. 3, the inner thread 11 on the elbow members is made oversized and the thread end 12 of the tube lengths 7 and 8 is cut undersized so that the difference between the overall diameter of the inner and outer threads respectively nearly disappears.

Prior to screwing the ends of the tube lengths 7 and 8 into the elbow piece 4, a band 13 of polytetrafluoroethylene is applied to the respective ends so that the volume of the individual threads is equal or larger than the volume of the clearance. When the lengths are screwed in, the clearance is completely filled and the excess of the polytetrafluoroethylene material is squeezed out at both ends of the joint.

A pipeline so made up can follow the connection pieces at its end into other positions since only the synthetic material in the clearances between the threads is subjected to deformation while the remaining elements of the line are rigid.

However, when the supply line changes its shape, plastic deformation plays a less important role relative to the movement of screwing the tube in and out of the connecting pieces, which movement results from the changes in the relative positions of A and B.

Since the polytetrafluoroethylene is practically indestructible and its coefficient of friction and other mechanical properties permit it to withstand the relatively high demands made on the supply line at the elevated temperatures used, the supply line enjoys an extended life-span and trouble-free operation.

The entire supply line, including all tube lengths and fittings, is surrounded by a heating unit 9 sheathed in its own insulating sheathing 10.

While for purposes of illustration the invention has been described in conjunction with a supply line for conveying a thermoplastic cement in a lasting machine, it is to be understood that in its broadest aspects the invention is applicable to any supply line which must be easily deformed and twisted while conveying a flow of material at elevated temperatures. Such, for example, would be a supply line for pouring plastic molds.

I claim:

1. In a deformable and twistable supply line for conveying a thermoplastic cement to be applied to an insole of a shoe when bonding an edge of an upper leather thereto with the insole resting on a last of a lasting machine, said supply line comprising first threaded connection means at one end thereof to define an inlet from a cement-heating container, second threaded connection means at an opposite end thereof to define an outlet to accommodate a cement applicator adjacent to the last, a heating element disposed along said supply line for maintaining the conveyed cement at a selected elevated temperature, a plurality of rigid metal tubing lengths and rigid connecting members disposed between said first and second connection means so that said inlet communicates with said outlet, said tubing lengths and said connecting members being in threaded association with each other, each threaded association providing a large degree of free play to define a substantial clearance between threads of said tubing lengths and associated threads of said connecting member, and means filling each clearance to permit twisting of said supply line while conveying a flow of material at said elevated temperature so that said outlet is movable relative to said inlet, said filling means for each clearance including a seal-acting band of a synthetic resin which is plastified at said elevated temperature to allow said twisting of said supply line.

2. The supply line defined by claim 1 wherein said threaded connecting members are provided with inner thread sets.

3. The supply line defined by claim 1, wherein said synthetic resin comprises polytetrafluoroethylene.

4. The supply line defined by claim 1, in that at least one of the tubing lengths is bent and its ends are interconnected by means of elbows.

5. The supply line defined by claim 1, wherein said heating element and an insulating sheathing are wound onto the supply line over its entire length.

6. The supply line defined by claim 1, wherein said tubing lengths are provided with outer thread sets, the bands of synthetic resin being disposed onto said outer thread sets with one band being applied onto one outer thread set.

7. In a shoe lasting machine, a supply source for liquid cement applicable to an insole of a shoe resting on said lasting machine, a distributor member oscillatory movable with respect to said source of cement for applying said cement to the insole, a flexible connection means disposed between said cement source and said distributor member to provide communication therebetween for conveying the liquid cement at a selected elevated temperature, said flexible connection means including rigid threaded pipe sections in threaded association with threaded coupling means, said coupling means providing substantial play between the threads of said coupling means and the threads of said pipe sections, and means interposed between said threads to fill clearances therebetween to permit swiveling of said rigid pipe sections with respect to each other while conveying the liquid cement at said elevated temperature, said interposed means including a band of synthetic resin which is plastified at said elevated temperature to allow said swiveling of said rigid pipe sections.

8. In a show lasting machine according to claim 7, wherein said synthetic resin comprises polytetrafluoroethylene.

9. In a shoe lasting machine according to claim 7, wherein heating elements and an insulating sheathing are wound onto said flexible connection means to cover its entire length for maintaining the conveyed liquid cement at said elevated temperature.